United States Patent
Olson et al.

(10) Patent No.: US 8,876,160 B2
(45) Date of Patent: Nov. 4, 2014

(54) VEHICLE CHASSIS WITH ANTI-CAMBER

(75) Inventors: Terry Kyle Olson, Greenfield, WI (US); Roy Frank Engelbrecht, Charlotte, MI (US)

(73) Assignee: Spartan Motors, Inc., Charlotte, MI (US)

( * ) Notice: Subject to any disclaimer, the term of this patent is extended or adjusted under 35 U.S.C. 154(b) by 623 days.

(21) Appl. No.: 12/952,830

(22) Filed: Nov. 23, 2010

(65) Prior Publication Data
US 2011/0121554 A1    May 26, 2011

Related U.S. Application Data

(60) Provisional application No. 61/264,493, filed on Nov. 25, 2009.

(51) Int. Cl.
| B62D 21/02 | (2006.01) |
| B62D 21/20 | (2006.01) |
| B62D 65/00 | (2006.01) |
| B62D 31/02 | (2006.01) |
| B62D 47/02 | (2006.01) |

(52) U.S. Cl.
CPC ............... *B62D 21/02* (2013.01); *B62B 21/08* (2013.01); *B62D 65/00* (2013.01); *B62D 21/20* (2013.01); *B62D 31/02* (2013.01); *B62D 47/02* (2013.01)
USPC .......... 280/781; 280/800; 180/312; 29/897.2; 296/184.1; 296/205

(58) Field of Classification Search
CPC ........ B62D 21/02; B62D 21/20; B62D 21/08; B62D 21/18; B62D 31/02; B62D 25/2054; B62D 65/00; B21D 47/00
USPC .......... 280/781, 800; 296/184.1, 205, 193.07, 296/157, 158, 203.01, 204; 180/312; 29/897.2, 897.3, 897.31, 446
See application file for complete search history.

(56) References Cited

U.S. PATENT DOCUMENTS

| 1,541,803 | A | * | 6/1925 | Evans | 280/800 |
| 1,846,567 | A | * | 2/1932 | Murray, Jr. | 280/796 |
| 1,911,061 | A | * | 5/1933 | Clark | 228/175 |
| 2,417,640 | A | * | 3/1947 | Fischbach | 280/423.1 |
| 3,092,396 | A | * | 6/1963 | Thomas | 280/789 |
| 3,300,839 | A | * | 1/1967 | Lichti | 29/897.35 |
| 3,528,678 | A | * | 9/1970 | Moulton | 280/796 |
| 5,088,752 | A | * | 2/1992 | Henderson et al. | 280/79.11 |
| 5,501,504 | A | * | 3/1996 | Kunz | 296/164 |
| 5,632,509 | A | * | 5/1997 | Reichert | 280/795 |
| 5,863,070 | A |   | 1/1999 | Williams et al. | |
| 6,123,378 | A | * | 9/2000 | Teply et al. | 296/29 |
| 6,688,678 | B2 | * | 2/2004 | Crean | 296/204 |
| 7,097,232 | B2 | * | 8/2006 | Beaudry et al. | 296/178 |
| 7,210,727 | B2 | * | 5/2007 | Stephenson | 296/104 |
| 7,350,818 | B2 | * | 4/2008 | Rini et al. | 280/781 |
| 7,559,578 | B2 | * | 7/2009 | van Leeve et al. | 280/781 |
| 7,770,928 | B2 | * | 8/2010 | Booher | 280/789 |

* cited by examiner

*Primary Examiner* — Paul N Dickson
*Assistant Examiner* — George Spisich
(74) *Attorney, Agent, or Firm* — Reinhart Boerner Van Deuren P.C.

(57) ABSTRACT

A vehicle chassis for motor homes, busses and similar vehicles is provided. In an embodiment, the chassis includes anti-camber to counteract the bending action provided by the engine being mounted rear ward of the rear axle(s) of the vehicle such that the rear axle(s) act as a fulcrum causing crowning of the chassis. Further, embodiments of the invention utilize through the frame construction for lateral support members to increase storage space of a basement region and to increase strength of the welded joints of the various structural members.

5 Claims, 12 Drawing Sheets

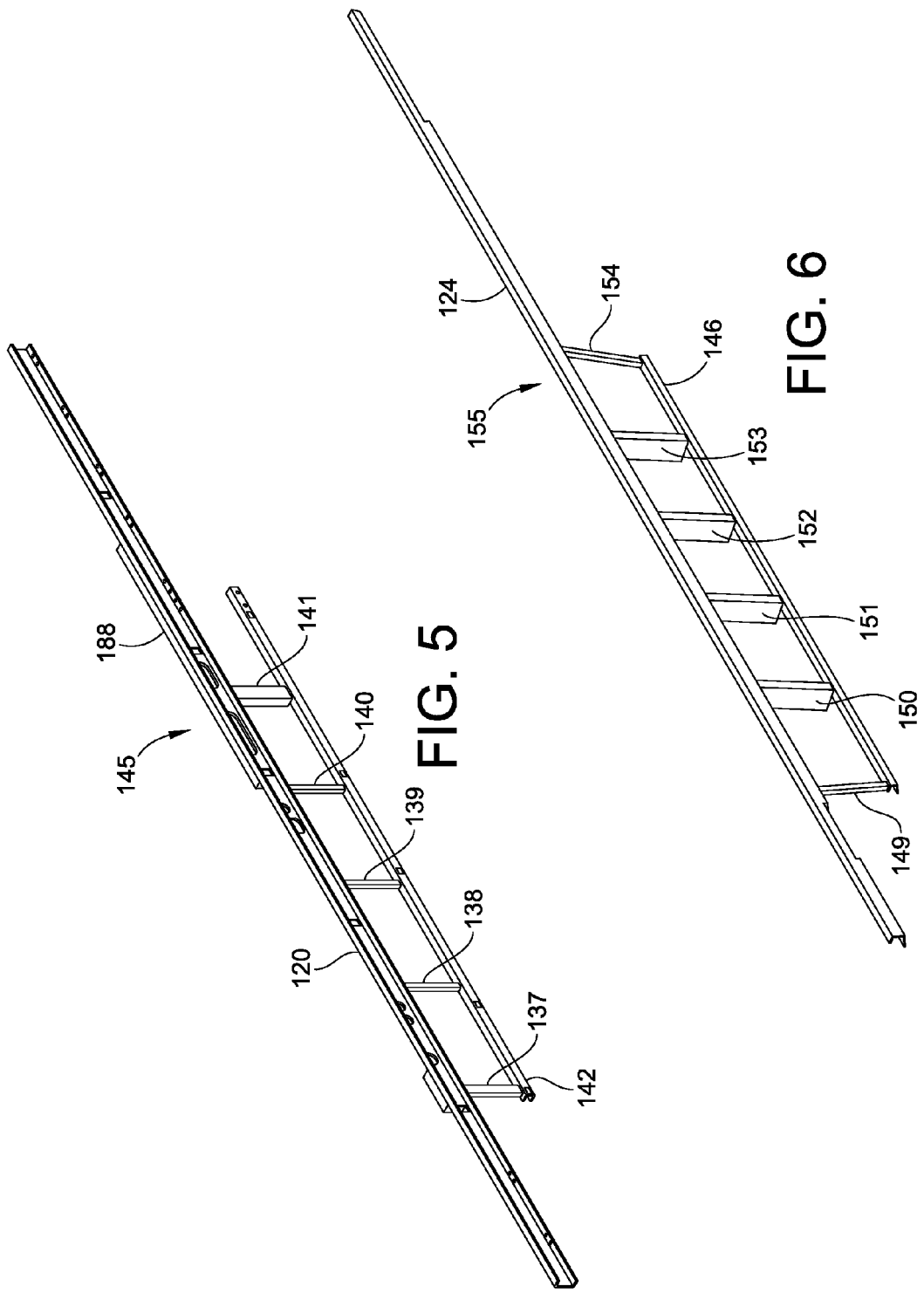

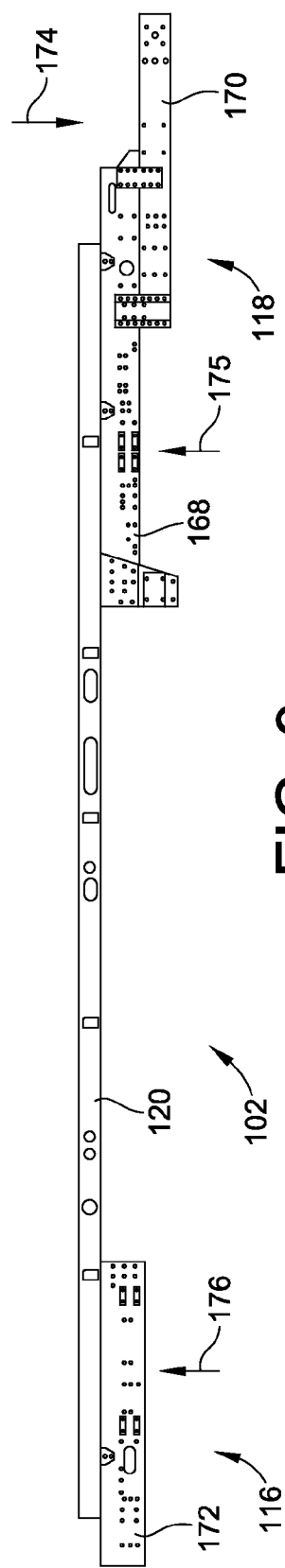
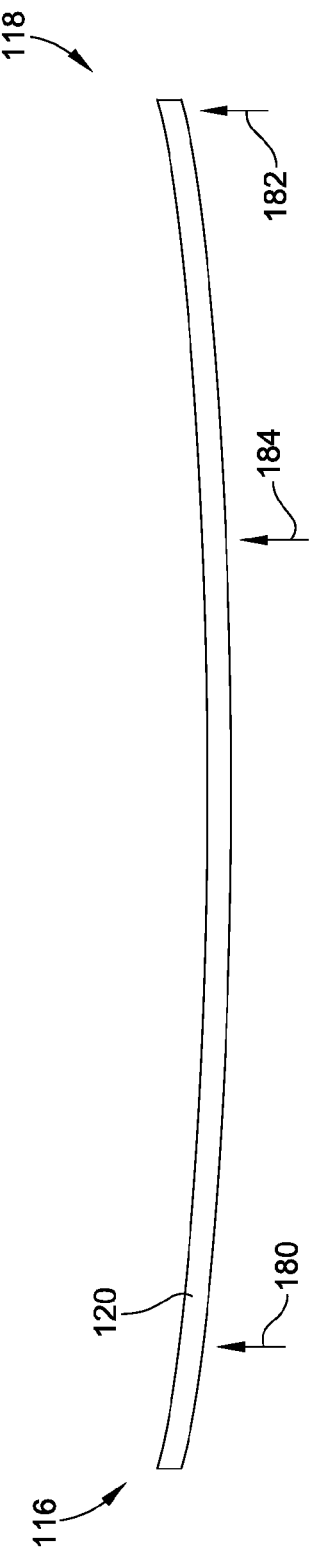
FIG. 9
FIG. 10

VEHICLE CHASSIS WITH ANTI-CAMBER

CROSS-REFERENCE TO RELATED PATENT APPLICATIONS

This patent application claims the benefit of U.S. Provisional Patent Application No. 61/264,493, filed Nov. 25, 2009, the entire teachings and disclosure of which are incorporated herein by reference thereto.

FIELD OF THE INVENTION

This invention generally relates to motor home and bus chassis.

BACKGROUND OF THE INVENTION

Standard construction of a motor home or bus (generally referred to herein as a "recreation vehicle" or "RV") requires construction of a chassis that may typically provide the mechanical workings of the RV. The chassis will typically house the suspension, the engine and drive train. The chassis will also operably support a body that will include a living environment including among other things a plurality of passenger seats in a bus or a living area in a motor home.

Often, the chassis and the mechanical workings of the RV may be formed as a modular unit that are then provided to a separate manufacturer who constructs the body of the RV on and integrated into the chassis. As such, the chassis builder will strive to provide the best base on which the body manufacturer can build and install the body onto and integrate into the chassis. More particularly, the chassis builder will strive to provide a generally planar working environment on which and into which the body can be built and incorporated.

When the chassis provides an uneven working environment, the floor of the body must be shimmed and leveled, much like floors and doors must be leveled in the construction of a building such that the components of the body are true and square.

It is desired, but not always necessary, to avoid crowns in the center of the chassis, i.e. between the front and rear of the chassis when viewed from the side, to avoid the need to level the floor of the body during assembly on opposite sides of the crown. If any deviation from a planar working environment is present, it is desired that the deviation takes the form of a dip such that any shimming can be done in the center of the floor.

This ability to avoid a crown can be very difficult in standard RV construction. This is true, because many RV's mount the engine to the chassis at a position rearward of the rear axle(s) of the RV. Thus, the rear axle(s) act as a fulcrum causing the portion of the chassis that is rearward of the axle(s) to bend vertically downward causing the middle and front of the chassis to want to be lifted vertically upward. This bending action will cause undesirable crowning of the chassis at a position between the front of the chassis and the rear axle(s). Due to the significant weight of the engine and its components, this bending can be rather significant. Merely increasing the size of individual structural members of the chassis may not be adequate to compensate for the bending as this can add undesirable weight and reduce volume for storage and other components of the RV. Every half-inch to inch of space savings can provide significant benefits.

Embodiments of the present invention relate to improvements in chassis for RV's and methods of manufacturing chassis for RV's.

BRIEF SUMMARY OF THE INVENTION

Embodiments of the present invention provide new and improved vehicle chassis and particularly new and improved chassis for vehicles such as motor homes and busses. Embodiments of the invention provide improved structural strength while other embodiments provide improved starting points upon which the body of the vehicle can be constructed.

In one embodiment, a vehicle chassis is provided that utilizes, in part, through the frame construction. As such, in one embodiment, the vehicle chassis comprises a pair of spaced apart center rails, a pair of spaced apart side rails and plurality of laterally extending outriggers is provided. The center rails are laterally interposed between and spaced from the spaced apart side rails. The plurality of laterally extending outriggers are perpendicular to the center rails and side rails. The plurality of laterally extending outriggers extend through a vertical webbing of each of the center rails.

In one embodiment, the shape of the apertures in the vertical webbing of the center rails through which the outriggers extend corresponds to the cross-section of the out-riggers. In a more particular embodiment, the outriggers are welded to the spaced apart center rails.

In a further embodiment, the outriggers extend laterally through a vertical webbing of each of the side rails. In an even further embodiment, the side rails are welded to the ends of the outriggers. The outriggers are continuous members extending substantially the full width of the chassis.

In a further embodiment, the chassis incorporates anti-camber preventing crowning of the chassis as a result of mounting an engine rearward of the rear axles of the vehicle. As such, in one embodiment, a vehicle chassis comprises a pair of spaced apart longitudinally extending center rails and an anti-camber fixing arrangement. The longitudinally extending center rails include anti-camber fixed therein. The anti-camber is such that prior to mounting an engine at a location rearward of a location of the chassis where a rear axle is mounted, the center rails have a vertically dished profile and after the engine has been mounted to the chassis, the degree of dishing is reduced. The anti-camber fixing arrangement fixes the anti-camber in the center rails prior to mounting the engine to the chassis.

In a more particular embodiment, wherein the anti-camber fixing arrangement includes a plurality of vertical uprights extending vertically downward from the center rails and a pair of bottom center rails attached to the opposite ends of the vertical uprights of the corresponding longitudinally extending center rails. More particularly, a plurality of the vertical uprights are welded between a first one of the center rails and a first one of the bottom center rails fixing the anti-camber in that center rail. A second plurality of the vertical uprights are welded between a second one of the center rails and a second one of the bottom center rails fixing the anti-camber in that center rail.

In a further embodiment, the anti-camber fixing arrangement includes a first support rail welded to the webbing of a first one of the center rails within a region in which anti-camber is provided in the first one of the center rails and a second support rail welded to the webbing of a second one of the center rails within a region in which anti-camber is provided in the second one of the center rails. The support rails fixing the anti-camber in the center rails. In a more particular embodiment, the vertical height of the center rails is greater than the vertical height of the support rails welded thereto.

Methods of adding the anti-camber to a chassis are also provided. In one embodiment, a method of forming a chassis unit including a chassis and an engine mounted rearward of a location at which rear axles of the chassis unit may be mounted is provided. The method includes bending first and second center rails to include anti-camber (i.e. a vertically downward dished shape). The method also includes fixing the anti-camber in the center rails such that the center rails have a dish shape in a longitudinal portion thereof. Further, the method includes operably mounting an engine to the center rails at a location rearward of a location of at least one rear axle mount. The step of mounting the engine removes the severity of the dish shape such that a top working platform defined, at least in part, by tops of the first and second center rail is substantially planar or is more planar than prior to the addition of the engine to the chassis.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a simplified perspective view of a center panel of the chassis of FIG. 2;

FIG. 6 is a simplified perspective view of a side panel of the chassis of FIG. 2;

FIG. 9 is a side view illustration of FIG. 8 illustrating the location of where the axle(s) or other support is provided to the chassis as well as generally indicating the location where loading provided by the engine is applied to the chassis;

FIG. 10 is a schematic exaggerated representation of a desired shape of the center rails of the chassis of FIG. 2 prior to the addition of the mechanical devices, such as the engine;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
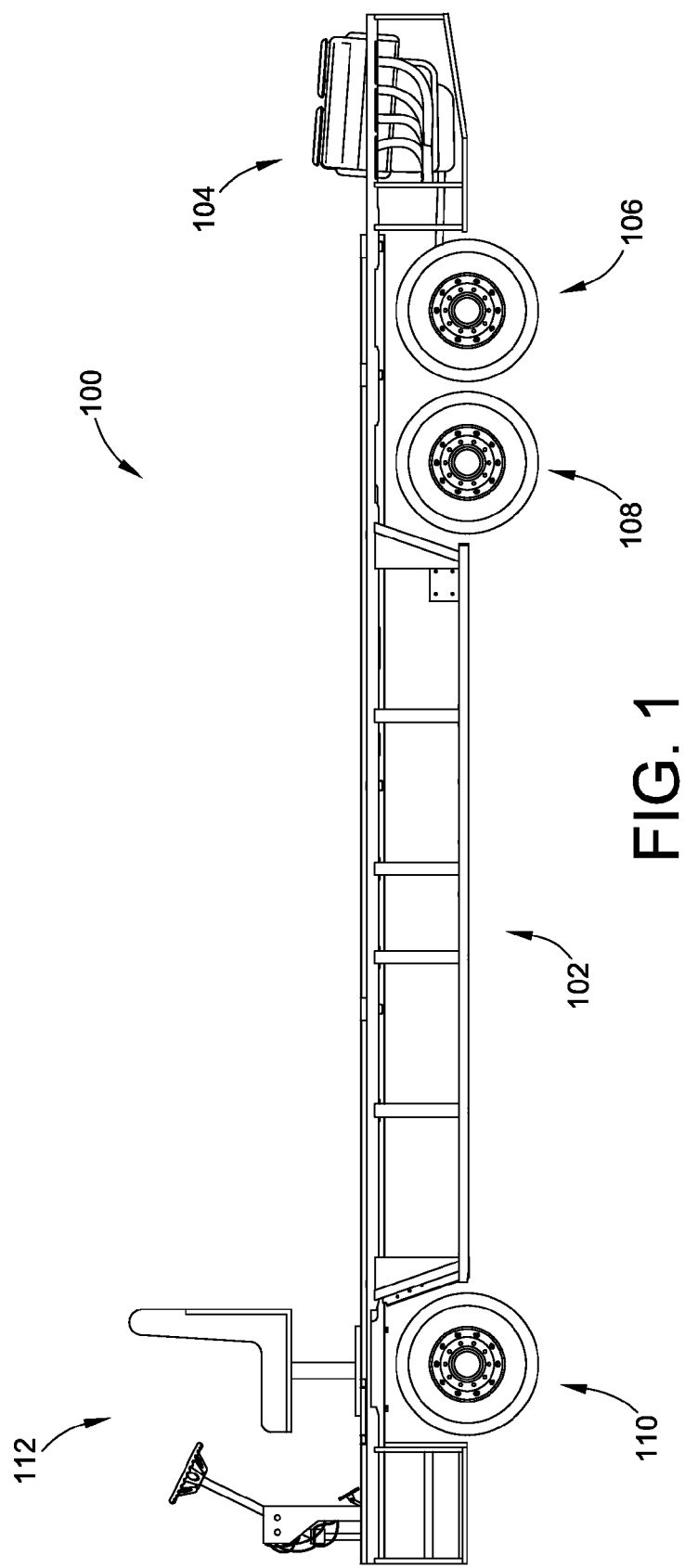
FIG. 1 is a side illustration of a rolling chassis for a bus or motor home according to an embodiment of the present invention.

FIG. 1 is a left side photograph of rolling chassis 100 (i.e. modular chassis unit) for an RV that includes a chassis 102, an engine 104, rear axles 106, 108 (represented by the tires forming part of the drive train), a front axle 110 (which may or may not be axle in some embodiments and be provided by independent front suspension), and a driver station 112.

The rolling chassis 100 is fully functioning in an embodiment such that it can be driven. As such, a subsequent builder need only build the body (e.g. seating area for a bus or living quarters for an RV) to complete the vehicle.

Figure 2:
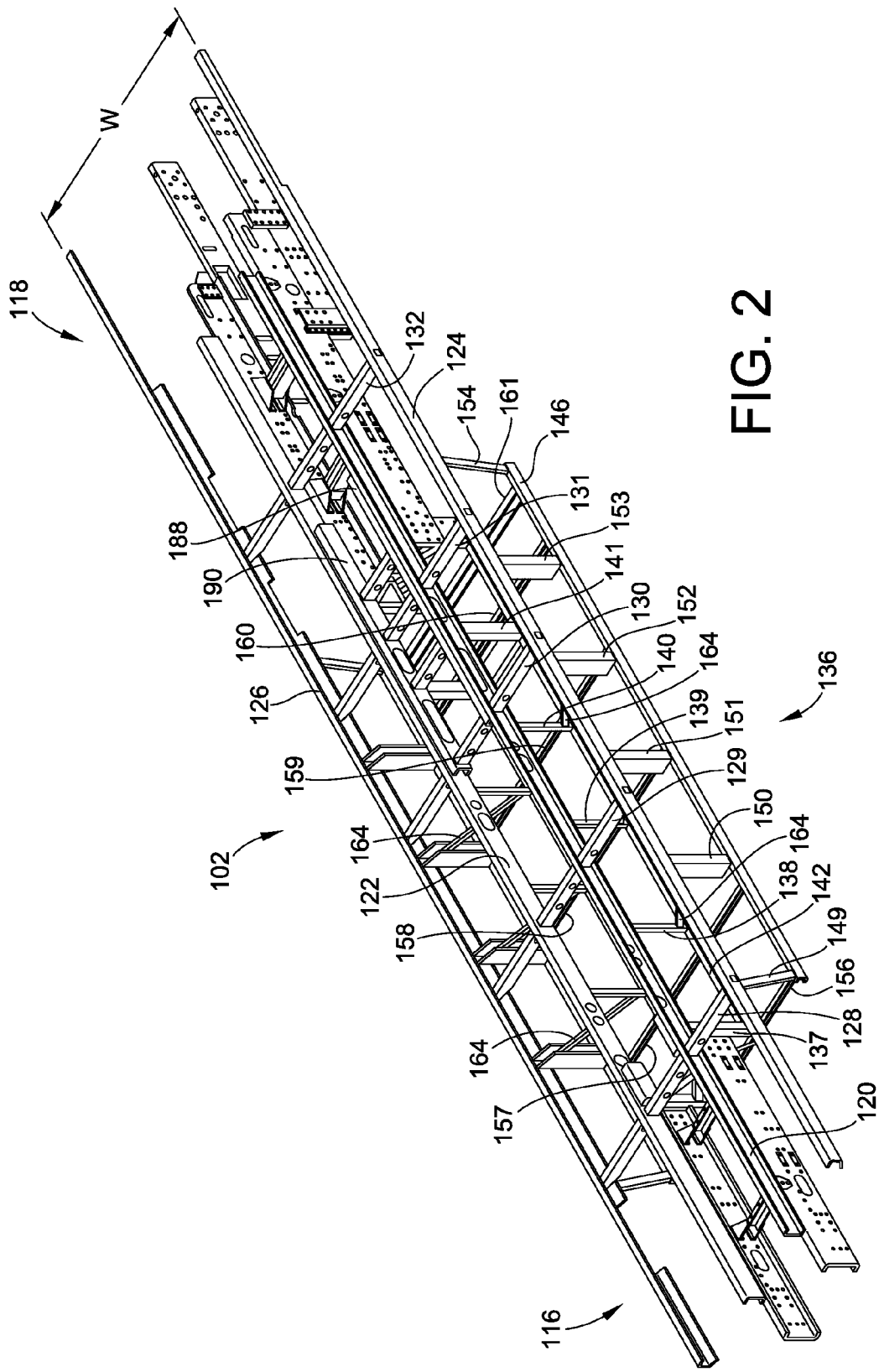
FIG. 2 is a simplified top perspective illustration of the chassis of the rolling chassis of FIG. 1.

The chassis 102 is more clearly illustrated in the simplified top perspective illustration of FIG. 2. In FIG. 2, the front 116 of the chassis 102 is illustrated generally toward the left or bottom of the page and the rear 118 of the chassis 102 is illustrated generally toward the right or top of the page.

The chassis 102 generally includes a pair of center rails 120, 122. Center rails 120, 122 are substantially mirror images of one another and extend substantially the entire length of the chassis. The center rails 120, 122 are laterally spaced apart from one another. In the illustrated embodiment, the center rails 120, 122 are C-shaped beams, referred to herein as C-channels. However, other structural members such as tubing or I-shaped members could be used in alternative embodiments. In the illustrated embodiment, the C-shaped beams have top and bottom flanges that extend laterally outward from their center webs.

The chassis 102 also includes a pair of side rails 124, 126 that are laterally spaced outward from the center rails 120, 122. As such, the center rails 120, 122 are laterally interposed between side rails 124, 126. In this embodiment, the side rails 124, 126 are in the form of C-channels with the top and bottom flanges of the C-channels extending laterally inward toward the adjacent center rails 120, 122 to form a smooth or flush outer surface for the side rails.

The lateral spacing between the center rails 120, 122 and side rails 124, 126 is maintained by a plurality (five in the illustrated embodiment) of horizontal outriggers 128-132 (also referred to as cross-rails). The horizontal outriggers are again formed as C-channels, but could be formed using other cross-sections.

In the illustrated embodiment, the individual outriggers 128-132 extend substantially the entire width W of the chassis 102 and are not formed from individual beams cut to the individual spacing's between adjacent ones of the center rails 120, 122 and side rails 124, 126.

To prevent unnecessarily increasing the vertical height of the chassis and to increase structural rigidity and reduce joint fatigue, the chassis uses "through the frame construction." As such, outriggers 128-132 pass through the vertical webbing of at least the center rails 120, 122 and preferably through the webbing of the side rails 124, 126. This significantly increases the vertical rigidity of the chassis 102 proximate side rails 124, 126 by eliminating standard butt joint welding of individual rails between the adjacent center rails 120, 122 and side rails 124, 126. Further, this allows welding of the outriggers 128-132 to the center rails 120, 122 and side rails 124, 126 on both sides of each center rail 120, 122 and side rail 124, 126. This is true where the outriggers 128-132 actually pass through the webbing of the side rails 124, 126.

To provide for this through the frame construction, the webbing of the individual center rails 120, 122 and side rails 124, 126 is removed in the cross-sectional shape of the individual outriggers 128-132. The use of the C-shaped or similar non-tubing styled beams reduces the amount of material that is removed from the webbing of the center rails 120, 122 and side rails 124, 126 increasing structural strength and reducing the stress concentrators at those locations and increasing the available welding surface area to increase joint strength.

Figure 3:
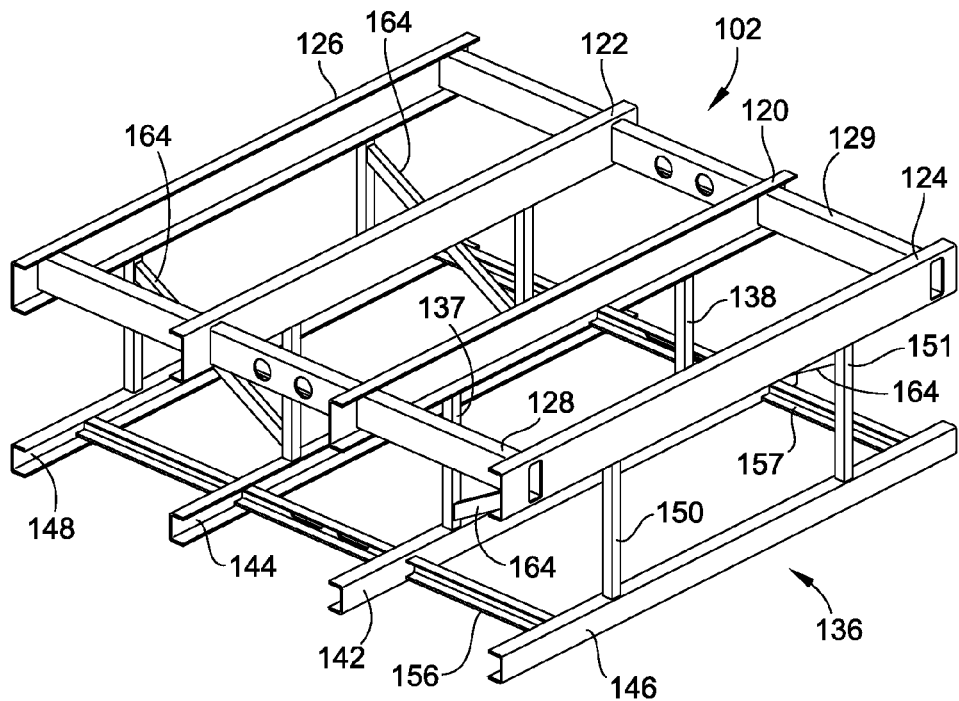
FIG. 3 is a simplified top perspective view of a portion of a chassis according to an embodiment of the present invention.
Figure 4:
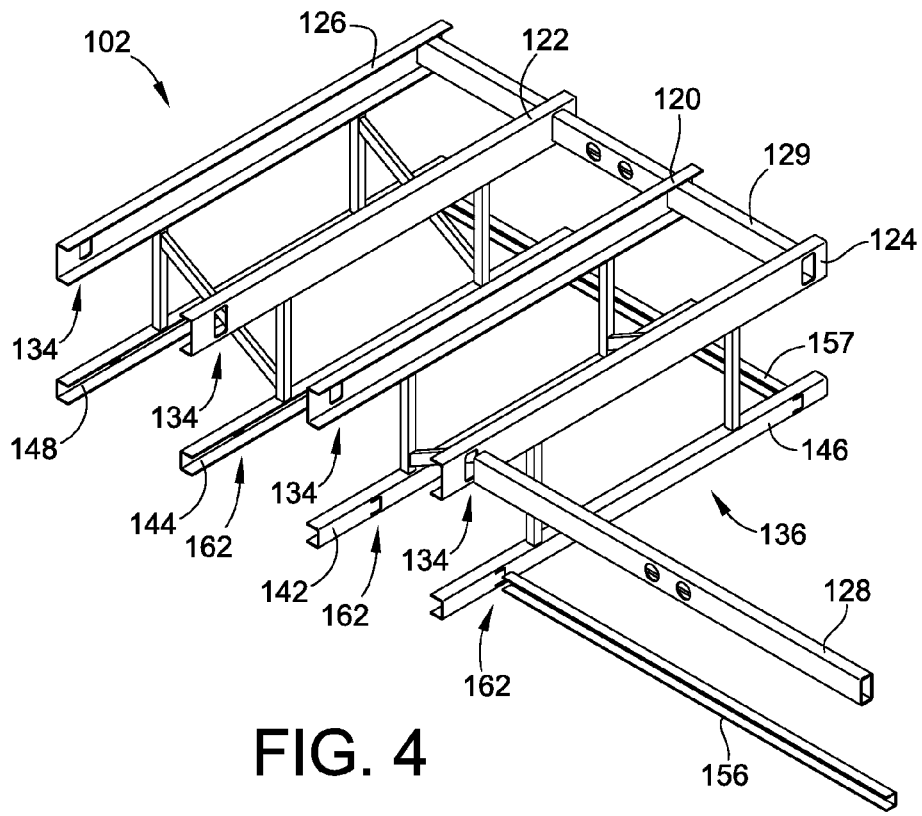
FIG. 4 is a simplified top perspective view of FIG. 2 having a top and a bottom outrigger removed to illustrate the through frame construction of embodiments of the present invention.

The through the frame construction is illustrated more fully in FIGS. 3 and 4 which provide simplified perspective illustrations of a section of a representative chassis 102. FIG. 3 has the section of the chassis 102 substantially fully assembled. More particularly, the outriggers 128, 129 are operably laterally connecting center rails 120, 122 and side rails 124, 126. FIG. 4 has outrigger 128 disconnected from center rails 120, 122 and side rails 124, 126 to show the openings 134 through the center rails 120, 122 and side rails 124, 126 through which outrigger 128 passes to implement the through the frame construction.

Further, the through the frame construction provides the advantage of metal-to-metal contact and not weld only support of the outriggers. Additionally, the through the frame construction assists dimensional stability in eliminating the stack tolerance of welding three separate tubes from left to right (i.e. between the four separate top rails 120, 122, 124, 126).

In this embodiment, outriggers 128, 129 are rectangular tubing. As such openings 134 have a similarly shaped cross-section for receipt of the corresponding outrigger 128.

Returning to FIG. 2, the chassis 102 includes a basement region 136 (also referred to generally as a "basement 136"). The basement region 136 provides for storage space as well as for housing additional function objects such as fluid storage tanks for the RV.

The through the frame construction provides for increased volume in the basement region 136 as the outriggers do not pass underneath center rails 120, 122, thereby increasing volume of the open locations of the basement region 136. By using the though the frame construction, a pass through height increase of between 5 and 7 inches can be added as compared to a typical ladder design and between about 2 to 5 inches over existing motor home space frame designs.

To form basement region 136, the chassis 102 includes a plurality of vertical uprights 137-141 that extend vertically downward from center rails 120, 122 to offset lower center rails 142, 144 (see also FIG. 3). For simplicity, in FIG. 2, only center rail 142 is viewable and only the vertical uprights 137-141 connecting center rail 120 with lower center rail 142 are identified by reference characters. However, center rail 144 (illustrated in FIG. 3) and the corresponding vertical uprights and center rail 122 operate just the same as center rail 120 and vertical uprights 137-141.

The vertical uprights 137-141 are welded to a bottom flange of center rail 120 and a top flange of bottom center rail 142. Each center rail 120, 122 and its corresponding vertical uprights 137-141 and lower center rail 142, 144 form an individual center panel. FIG. 5 illustrates a center panel 145 that includes center rail 120, vertical uprights 137-141 and lower center rail 142.

The chassis 102 has a second center panel that is substantially identical to center panel 145 that includes center rail 122 and lower center rail 144. During construction, each center panel is formed separately and then connected to one another using, at least outriggers 128-132.

Returning to FIG. 2, the basement region 136 further includes a pair of lower side rails 146, 148 (see also FIG. 3 for lower side rail 148) that correspond to side rails 124, 126, respectively. The lower side rails 146, 148 are vertically offset from side rails 124, 126 by further vertical uprights 149-154. Again, the vertical uprights 149-154 are welded to a bottom flange of side rail 124 and an upper flange of side rail 146.

Each side rail 124, 126 and its corresponding vertical uprights 149-154 and lower side rail 146, 144 form an individual side panel. FIG. 6 illustrates a side panel 155 that includes side rail 124, vertical uprights 149-154 and lower side rail 146.

The bottom center rails 142, 144 and bottom side rails 146, 148 provide a basement floor.

With reference to FIG. 2, a plurality of lower outriggers 156-161 laterally connect the bottom center rails 142, 144 and the lower side rails 146, 148 much like out riggers 128-132. Again, through the frame construction is preferably used to connect out riggers 156-161 to lower center rails 142, 144 and lower side rails 146, 148. This through the frame construction for the lower outriggers is also illustrated in FIGS. 3 and 4. Thus lower center rails 142, 144 and lower side rails 146, 148 include apertures or openings 162 through which (for illustrative purposes) lower outrigger 156 passes. Again, the outrigger is then welded within these apertures 162. In FIG. 4, it can be seen that apertures 162 are formed in a generally C-shaped channel because the lower outriggers in that figure are C-channel constructions rather than tubing or other cross-sectional beams.

With reference to FIGS. 2, 3 and 4, the basement region 136 also includes a plurality of supports 164 that extend laterally between adjacent vertical uprights, such as for example uprights 137 and 150 in FIG. 3 at an inclined angle to provide both lateral and vertical support. Supports 164 provide lateral support between adjacent center and side panels as well as provide additional vertical support to prevent sagging of the side panels. By having the supports 164 extend laterally outward and vertically upward in that same outward direction, the supports 164 are loaded in compression rather than tension when the RV is assembled reducing potential failure of the connecting joints and more efficiently preventing any sagging of the side panels.

During assembly, the individual panels are typically manufactured and then connected together using out riggers 128-132 and 156-161.

Figure 7:
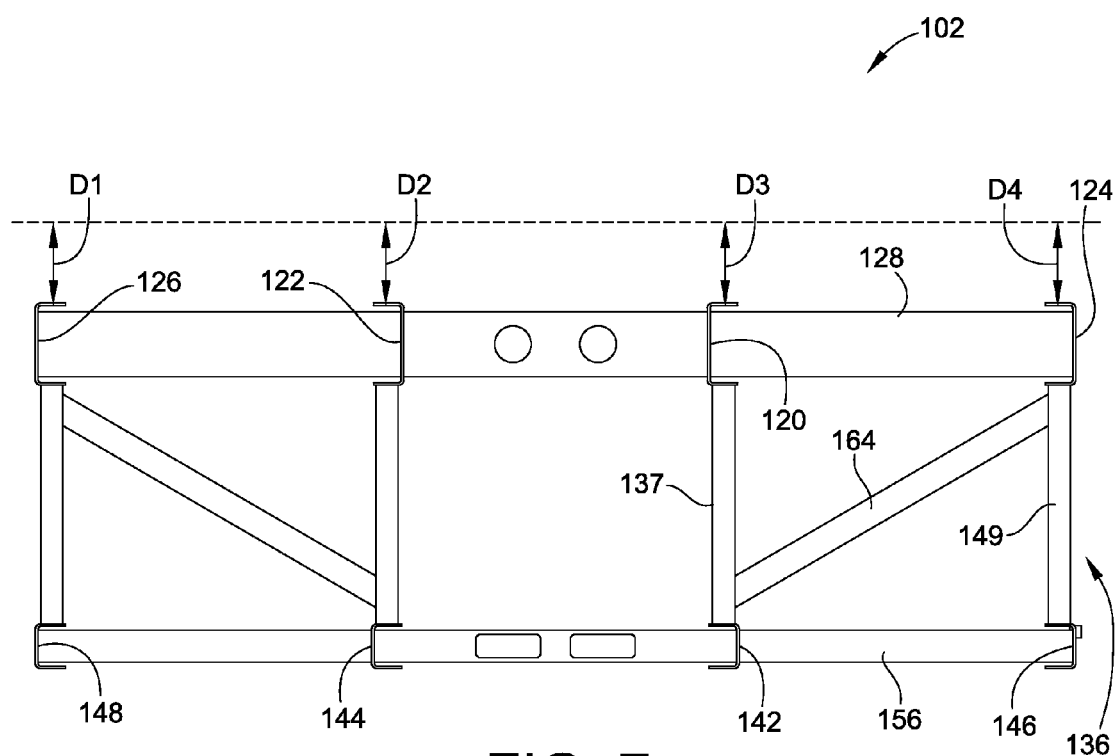
FIG. 7 is an cross-sectional illustration of the portion of a chassis of FIG. 3.

With reference to FIG. 7, the gage of the material used for the side rails 124, 126 may be thinner than the gage of the material used for center rails 120, 122 and similarly the gage of the material used for side rails 146, 148 may be thinner than the gage of the material used for center rails 142, 144. This reduction in thickness can be attributed to the increased load carried by the center rails 120, 122 and 142, 144. By reducing gage thickness for various structures, the overall weight of the chassis 102 can be reduced while maintaining the desired rigidity and stiffness.

FIG. 7 also illustrates the truss-like configuration of the basement region 136 to increase stiffness. In this embodiment, the chassis 102 incorporates the basement region 136 into the structural design of the chassis 102 to prevent twisting and to increase rigidity. This is opposed to prior designs that typically hung everything from the two primary center rails (e.g. center rails 120, 122). The supports 164, the upper and lower outriggers as well as the through the frame construction assists in integrating the basement into the overall structural strength of the chassis 102.

With continued reference to FIG. 7, the top surface of the center rails 120, 122 and side rails 124, 126 provide a working platform or working environment upon which a manufacturer will build the body of the RV. In one embodiment, it is desired to maintain the top surfaces of those rails 120, 122, 124, 126 within high tolerances. More specifically, the vertical tolerancing of the location of the individual rails 120, 122, 124, 126, (i.e. variation in distances D1-D4 from a theoretical horizontal plane 166) is less than 0.25 inch, and more preferably less than 0.125 inch.

While FIG. 7 illustrates that distances D1-D4 are equal, in some embodiments, Distances D1 and D4 may be different than distances D2 and D3. Preferably, but not necessarily, D2 and D3 are greater than distances D1 and D4. However, D1 and D4 could be greater than D2 and D3.

Figure 8:
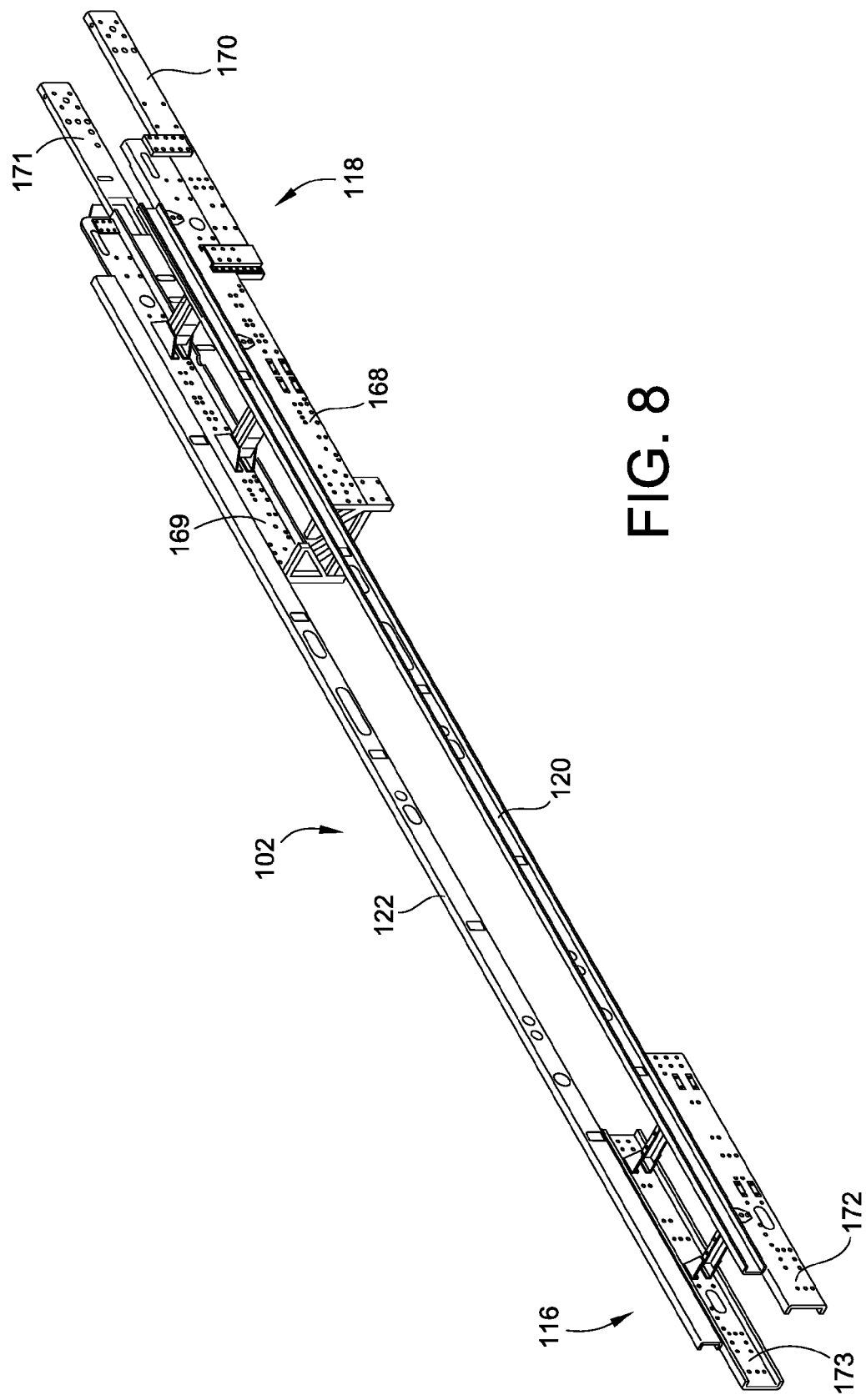
FIG. 8 is a simplified partial illustration of the chassis of FIG. 2 illustrating the frame rails used to mount mechanical devices such as the engine, axles, suspension and drive train to the chassis.

With reference to FIG. 8, the chassis 102 also includes structural members to which the engine, drive train and suspension are connected and by which they are supported. At the rear 118 of the chassis 102, a pair of rear frame rails 168, 169 are directly connected to center rails 120, 122, respectively. Frame rails may be also referred to as "drop rails." The suspension and rear axle(s) of the RV (see FIG. 1) are supported by and connected to the frame rails 168, 169. The frame rails 168, 169 are connected to bottom surfaces of the center rails 120, 122. Due to the significant load supported by the rear axle(s) the frame rails 168, 169 have a much larger profile and resistance to bending than center rails 120, 122.

Attached to frame rails 168, 169 are double frame rails 170, 171 which are vertically below frame rails 168, 169 such that frame rails 168, 169 are vertically interposed between center rails 120, 122 and double frame rails 170, 171, respectively. The engine, among other devices, are mounted to the double frame rails 170, 171.

Typically frame rails 168, 169 are connected to center rails 120, 122, respectively, by brackets and/or connectors such as bolts. Similarly, frame rails 168, 169 are typically connected to double frame rails 170, 171 by brackets and/or connectors such as bolts.

At the front end 116 of the chassis 102, the front suspension and wheels and/or axle connect to front frame rails 172, 173 connected to the bottom side of center rails 120, 122.

FIG. 9 illustrates a partial profile illustration of the chassis 102 of FIG. 2. It is also desired to reduce variation in the top surface of the individual rails 120, 122, 124, 126 and most preferably center rails 120, 122. As noted previously, it is desired to have the working platform (defined by rails 120, 122, 124, 126) to be planar and to have any variation from planar to be in the form of a dish shape when viewed from the side. FIG. 10 is a simplified exaggerated illustration of such dish shape illustrated solely by center rail 120. Notably, the center portion of the center rail 120 (i.e. portion between ends 116 and 118) is vertically lower than ends 116, 118.

Unfortunately, due to the desired location of the engine 174 (illustrated as arrow 174 in FIG. 9) being positioned rearward of the rear axle(s) 175 (illustrated as arrow 175), a bending moment is imparted to chassis 102 with the rear axle(s) 175 acting as a fulcrum. This tends to cause the chassis 102 to want to bend such that it would be crowned in a position between the rear axle(s) 175 and the front wheels 176 (illustrated as arrow 176). This crowning in the center of the chassis 102 is undesirable.

Therefore, in one embodiment of the present invention, the chassis 102 incorporates what the applicants refer to as "anti-camber." Anti-camber counter-acts the effect of the bending moment produced by the components of the RV that are attached to the chassis 102. This provides a working platform that is generally planar after objects such as the engine, drive train, suspension and other components are mounted to the chassis 102. The anti-camber is particularly focused on correcting for the extremely heavy components that are over slung rearward of the rear axle(s). The focus of the anti-camber is added to the center rails 120, 122 but can be incorporated into the side rails 124, 126 as well.

The anti-camber is welded or otherwise fixed with anti-camber fixing arrangement into the chassis. To provide the anti-camber, the center rails 120, 122 are pre-curved into a dish shape prior to forming the center panel 145. Then, after the mechanical components of the RV, such as the engine, suspension, axles, etc. are added to the chassis 102 the load provided by engine 174 will cause bending of center rails 120, 122 that will remove the anti-camber, i.e. pre-curved profile, of the center rails 120, 122 to provide substantially straight center rails 120, 122.

Figure 11:
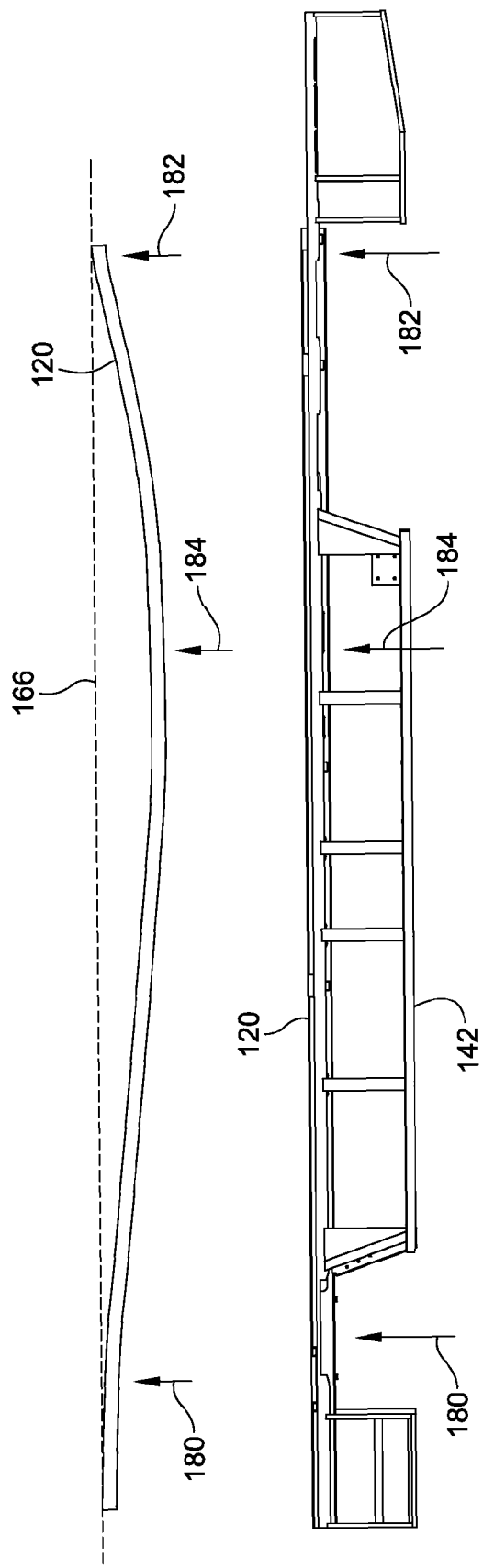
FIG. 11 is a side view of the chassis of FIG. 2 along with an exaggerated schematic representation of the anti-camber built into top center rails of the chassis of FIG. 2.
Figure 12:
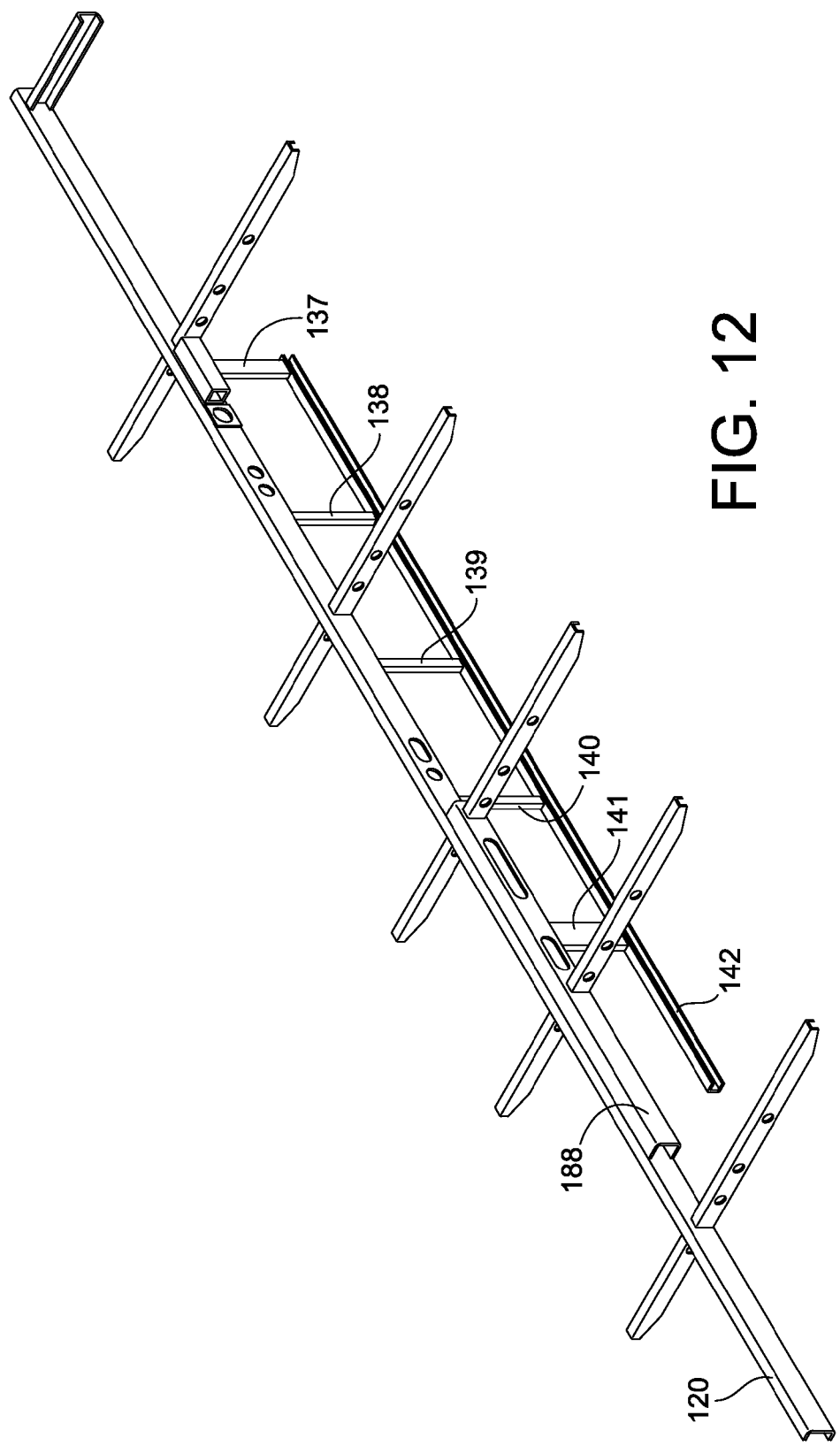
FIG. 12 is a simplified perspective view of a center panel of the chassis of FIG. 2 further including outriggers passing therethrough.
Figure 13:
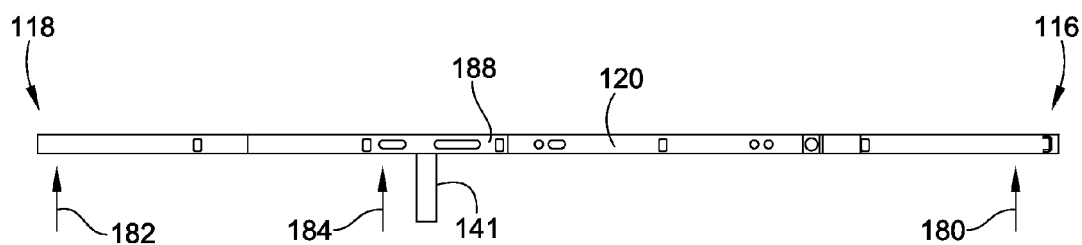
FIG. 13 is a simplified profile illustration of the center panel of FIG. 12 illustrating particular reference locations for applying anti-camber or zero locations.

With reference to FIGS. 10 and 11, the anti-camber of center rails 120, 122 will be further described. Reference locations 180, 182 are considered "zero locations" because these two points are typically maintained as the highest points relative to horizontal plane 166 prior to assembly of the rolling chassis, i.e. addition of the engine and other mechanical components.

In that regard, the center rails 120, 122 are provided with varying displacement from the horizontal plane 166 to provide the pre-curved shape. Due to the dished shape, a maximum anti-camber location is located at reference location 184. In one embodiment, the maximum anti-camber location is located closer to the rear zero location, i.e. reference location 182 than to the front zero location, i.e. reference location 180.

In some embodiments, depending on such things as material of the chassis, rigidity of the individual components (i.e. gage thickness, profile, etc.) more or less anti-camber may be required. Typically, the maximum anti-camber reference location 184 will have no more than 0.75 inches of anti-camber but no less than 0.10 inches of anti-camber. Anti-camber is the amount of displacement from theoretical horizontal plane 166.

In some embodiments, the zero location 180 may not actually be at 0.00 inches of anti-camber. Instead, there may be anti-camber added the entire length of the center rails 120, 122.

To import the anti-camber into center rails 120, 122, the center rails 120, 122 are fixtured with a predetermined amount of initial anti-camber. This initial amount of anti-camber may be greater than the desired amount of anti-camber after the chassis 102 has been assembled.

Once the center rails 120, 122 have been fixtured, the center panels 145 are assembled. The vertical uprights 137-141 are welded to the bottom surface of the center rails 120, 122. Then, the bottom center rails 142, 144 are welded to the bottom ends of the vertical uprights 137-141. Because the welded joints are prevented from rotating, the combination of the vertical uprights 137-141 and center rails 142, 144 prevent center rails 120, 122 from bending back to a generally straight member.

Further, as illustrated in FIG. 11, the anti-camber extends further along the rear end of the center rails 120, 122 than the bottom center rails 142, 144. To maintain the anti-camber in the center rails 120, 122 rearward of the last vertical upright 141, the chassis includes a pair of support rails 188, 190 welded to the laterally inner surfaces of the center rails 120, 122, respectively. These support rails 188, 190 are illustrated in FIGS. 2, 5 and 12-14. By welding support rails 188, 190 to center rails 120, 122 after the anti-camber has been added to the center rails 120, 122, the support rails 188, 190 help maintain this anti-camber prior to addition of the mechanical components to the chassis 102.

Figure 14:
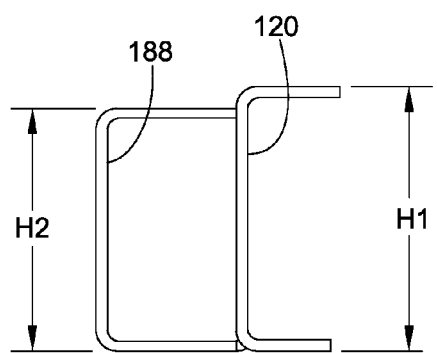
FIG. 14 is an end view illustration of a center rail having an attached support rail that provides additional rigidity and assists in maintaining the anti-camber for the chassis of FIG. 2.

With reference to FIG. 14, the center rail 120 has a height H1 that is greater than a height H2 of the support rail 188. This height differential allows the center rail 120 to be anti-cambered, e.g. bent, without the generally straight support rail 188 from extending vertically above the top surface of the center rail 120. This assists in preventing the support rail 188 from interfering with the providing a planar working surface with the center rails 120, 122 and side rails 124, 126. To further prevent interference of the support rail 188 with a planar working surface, the support rail 188 is shifted vertically downward toward the bottom of the center rail 120.

While not necessary, in some embodiments, the anti-camber is further maintained by adjusting the lengths of the vertical uprights 137-141. More particularly, the amount of anti-camber that is built into the center rails 120, 122 may correlate to an amount of variation in the length of the vertical uprights 137-141. Therefore, the vertical uprights 137-141 proximate the most anti-camber will be the shortest. This allows the bottom center rail 142, 144 to remain straight and reduces if not eliminates the need to bend the bottom center rails 142, 144 when securing them to the bottom ends of the vertical uprights 137-141.

Figure 15:
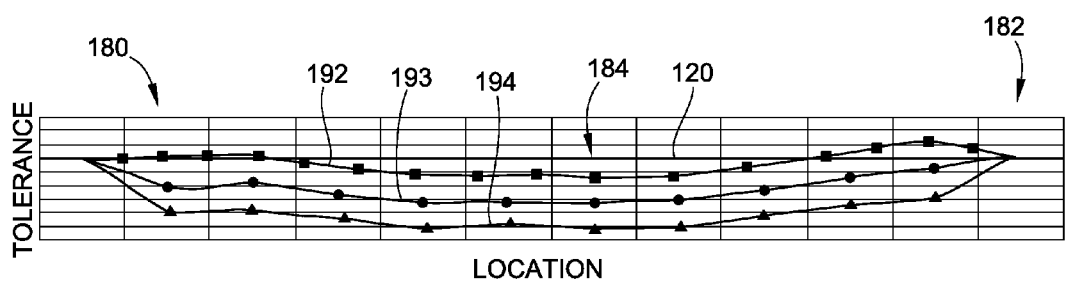
FIG. 15 is a schematic representation of potential anti-camber ranges to be built into the center rails of the chassis of FIG. 2, illustrating the non-uniform anti-camber along the length of the center rails.

It should be noted that the addition of the anti-camber need not be a smooth curve. FIG. 15 provides a schematic representation of one anti-camber arrangement for a center rail. The top line identified by reference number 120 is a theoretically straight center rail 120. The top curved line 192 (including the squares) provides an upper limit on the anti-camber. Middle line 193 (including the circles) is the desired anti-camber Lower line 194 (including the triangles) is the lower limit on the amount of anti-camber.

Prior to being attached to the outriggers 128-132 and 156-161, the side panels 155 are assembled. In some embodiments, there is no need to build in any anti-camber into the side panels 155. This is because the bending moment that is applied to the center rails by the engine and other components is not directly applied to the side panels 155 and particularly side rails 124, 126. However, in other embodiments, the side rails 124, 126 could include anti-camber.

After all four panels (two center panels 145 and two side panels 155) are assembled, they are attached to one another using out riggers 128-132 and 156-161. The outriggers 128-132 are passed through at least center rails 120, 122 and in some embodiments side rails 124, 126. Similarly outriggers 156-161 are passed through at least bottom center rails 142, 144 and in some embodiments bottom side rails 146, 148. This again, provides the through the frame construction design to improve the strength of the chassis 102.

After the panels are interconnected, the rest of the chassis structures can be added, such as supports 164 and frame rails 168-173.

After the chassis 102 is assembled the rest of the mechanical components of the rolling chassis 100 can be added. As more and more components are added to the chassis 102, the chassis 102 and particularly center rails 120, 122 will begin to flex and remove the anti-camber that was built into the chassis 102 and provide a generally planar working platform or surface for a subsequent builder to build a body for the RV.

Figure 16:
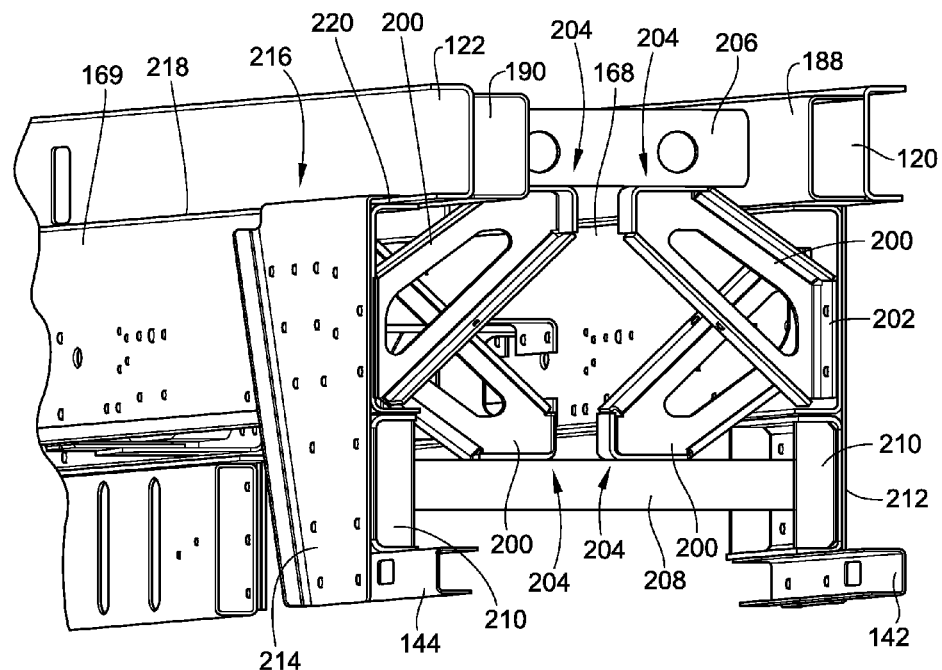
FIGS. 16 and 17 illustrate an anti-torsion connection arrangement for connecting the rear frame rails to the center rails of the chassis of FIG. 2.
Figure 17:
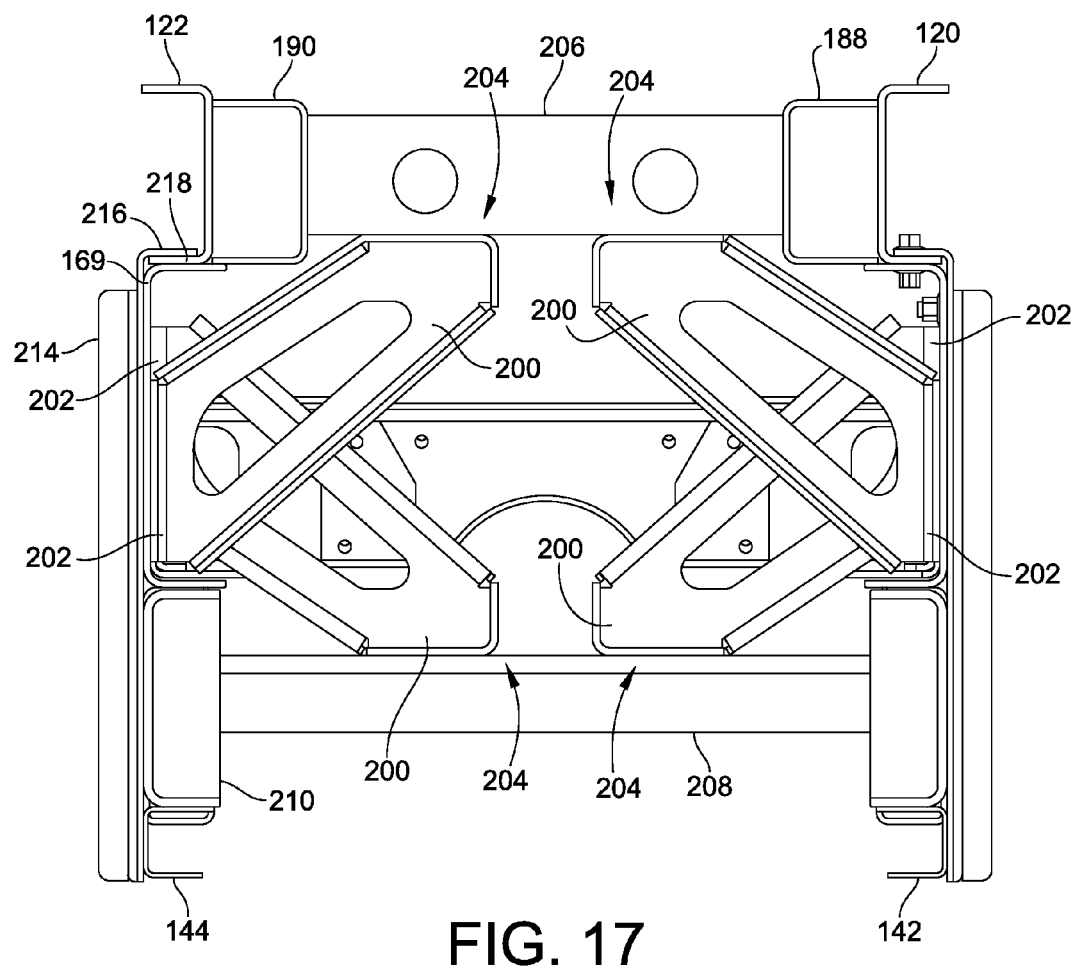

With reference to FIGS. 16 and 17, the chassis 102 also includes an improved design for mounting frame rails 168, 169 to the rest of the chassis. The new design allows the frame rails 168, 169 to be installed from the rear without interfering with the basement region 136 or the center rails 120, 122. Further, the connection increases the torsional stiffness of the chassis 102 proximate the location where the rear axle(s) are mounted.

The rear of the chassis 102 includes four trapezoidal cross-members 200 that have larger bases 202 that taper to narrowed ends 204. The cross-members 200 extend laterally inward from frame rails 168, 169 and vertically into engagement with either upper horizontal support rail 206 or lower horizontal support rail 208.

Upper horizontal support rail 206 extends laterally between center rails 120, 122 and more particularly support rails 188, 190 attached thereto. The horizontal support rail 206 is vertically aligned with the center rails 120, 122 and generally welded therebetween.

Lower horizontal support rail 208 is vertically above the lower support rails 142, 144 and is connected thereto by brackets 210. Brackets 210 are typically welded to the top surface of bottom center rails 142, 144.

A pair of fish plates 212, 214 (also referred to as tie plates) provide further structural rigidity to the connection. More particularly, with reference to fish plate 214, which is substantially identical to fish plate 212, the operation of the fish plates 212, 214 will be discussed.

Fish plate 214 includes a top flange 216 that is vertically above and overlaps with a bottom flange 218 of center rail 122, which is vertically above frame rail 169. A connector, such as bolt (not shown) passes vertically through the overlapping flanges of the fish plate 214, the center rail 122, and frame rail 169. The fish plate 214 extends vertically along side the frame rail 169 as well as bracket 210 and bottom center rail 144. Horizontally extending fasteners will pass laterally through the fish plate 214 and the bottom center rail 144. Additionally, horizontally extending fasteners will pass laterally through fish plate 214 and bracket 210. Horizontally extending fasteners will also pass through the base end of both of the trapezoidal cross-members 200, the frame rail 169 and the fish plate 214.

As illustrated in FIG. 16, it can be seen that the chassis is free of any vertical support members that interfere with the front end 220 of the frame rail 169. Thus, the axial position of the frame rail 169 relative to the center rail 122 can be adjusted without interfering with the rest of the chassis. This is unlike prior designs, where the chassis included a vertical upright that the front end 220 of the frame rail 169 would axially abut. Unfortunately, if the position of the frame rail 169 need to be adjusted closer to the front of the chassis, the front end 220 of the frame rail 169 would need to be machined to remove the interference with the vertical upright. This arrangement assists in the prevention of run-out interference.

Further yet, prior to assembly of the joint, the vertical gap between the bottom surface of flange 218 of the center rail 122 and the top surface of bracket 210 is tolerance to allow the frame rail 169 to be inserted axially therebetween. In one embodiment, the distance, prior to full assembly of the chassis 102, between the top surface of bracket 210 and the bottom surface of flange 218 is between about one-eighth of an inch and three-eighths of an inch greater than the height of frame rail 169, measured from the outer surfaces thereof. This one-eighth to three-eighth inch tolerancing allows the frame rail 169 to be axially slid between the center rail 122 and bracket 210.

However, the use of connectors to connect the fish plate 214 to center rail 122, frame rail 169, bracket 210 and bottom center rail 144 allows the assembler to draw all components vertically together to provide a rigid connection increasing the stiffness of the connection and the resistance to torsion for the chassis. More particularly, when the connectors connecting those components are tightened, the fish plate 214 will draw lower center rail 144 and bracket 210 vertically upward toward center rail 122 to remove the one-eight to three-eighth inch tolerance or gap that was present prior to tightening of the connectors.

This clearance and tolerance provides a significant benefit particularly when using a pre-cambered chassis. This is because, if the frame rail 169 is aligned with center rail 122 which includes anti-camber, it will also be angled relative to the gap between bracket 210 and center rail 122, which can, if the tolerancing is not present, cause interference between the bracket 210 or center rail 122 and the frame rail 169 during assembly. This tolerancing or gap provides the ability to form the rear portion of the chassis as an entire unit (i.e. the inclusion of double frame rails 170, 171 and in some embodiments the engine itself) and then mount it to the rest of the chassis 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vehicle chassis comprising:
a pair of spaced apart longitudinally extending center rails, the longitudinally extending center rails including anti-camber fixed therein by bending of the center rails such that prior to mounting an engine at a location rearward of a rear axle of the chassis, the center rails have a vertically dished profile and after the engine has been mounted to the chassis, the degree of dishing is reduced;
an anti-camber fixing arrangement fixing anti-camber in the center rails prior to mounting the engine to the chassis, wherein the anti-camber fixing arrangement includes a plurality of vertical uprights extending vertically downward from the center rails and a pair of bottom center rails attached to the opposite ends of the vertical uprights of the corresponding longitudinally extending center rails.

2. The vehicle chassis of claim 1, wherein the anti-camber fixing arrangement includes a first support rail welded to webbing of a first one of the center rails within a region in which anti-camber is provided in the first one of the center rails and a second support rail welded to webbing of a second one of the center rails within a region in which anti-camber is provided in the second one of the center rails.

3. The vehicle chassis of claim 2, wherein the vertical height of the center rails is greater than the vertical height of the support rails welded thereto.

4. The vehicle chassis of claim 1, wherein adjacent ones of the vertical uprights extending between one of the center rails and the corresponding bottom center rail have different lengths.

5. The vehicle chassis of claim 1, wherein the maximum amount of anti-camber is no more than 0.75 inches.

* * * * *